United States Patent [19]

Balkanski

[11] Patent Number: 4,816,356

[45] Date of Patent: Mar. 28, 1989

[54] PROCESS FOR PRODUCING A SOLID STATE BATTERY

[76] Inventor: Minko Balkanski, 2, avenue de Camoens, 75016 Paris, France

[21] Appl. No.: 117,869

[22] Filed: Nov. 9, 1987

Related U.S. Application Data

[63] Continuation-in-part of Ser. No. 859,819, May 5, 1986, Pat. No. 4,730,383.

[51] Int. Cl.$^4$ ............... H01M 4/38; H01M 10/38
[52] U.S. Cl. ............... 429/191; 29/623.5; 429/218
[58] Field of Search ............... 429/124, 191, 218; 148/DIG. 115; 29/623.5

[56] References Cited

U.S. PATENT DOCUMENTS

| | | | |
|---|---|---|---|
| 4,294,898 | 10/1981 | Hartstein | 429/104 |
| 4,299,890 | 11/1981 | Rea et al. | 429/124 |

FOREIGN PATENT DOCUMENTS

| | | |
|---|---|---|
| 51947 | 5/1982 | European Pat. Off. |
| 103470 | 3/1984 | European Pat. Off. |
| 2550015 | 2/1985 | France |
| 57-21073 | 2/1982 | Japan |
| 58-126679 | 7/1983 | Japan |
| 59-224065 | 12/1984 | Japan |

OTHER PUBLICATIONS

Holloway et al., "Oriented Growth of Semiconductors, IV, Vacuum Deposition of Epitaxial Indium Antimonide", *Journal of Applied Physics*, vol. 37, No. 13, Dec. 1966, pp. 4694–4699.

Geis et al., "Crystallographic Orientation of Silicon on an Amorphous Substrate Using an Artificial Surface-Relief Grating and Laser Crystallization", *Appl. Phys. Lett.*, 35(1), 1 Jul. 1979, pp. 71–74.

The Condensed Chemical Dictionary; Hawley, 1981, pp. 621 and 981.

*Handbook of Chemistry and Physics*, Weast, 56th Edition, 1975–1976, p. B-108.

Chabel et al., "Nature on Vicinal Laser-Annealed (Si(111) Surfaces", Physical Review B, vol. 24, No. 6, 15 Sep. 1981, pp. 3303–3309.

Park et al., "Transitions on Vicinal Surfaces", presented at the International Conference on Solid Films and Surfaces, Hamamatsu, Japan, Aug. 23–37, 1987.

*Primary Examiner*—Donald L. Walton
*Attorney, Agent, or Firm*—Lowe, Price, Leblanc, Becker & Shur

[57] ABSTRACT

A process for producing a solid state battery successively comprising, superimposed between two metallic contact elements, a layer or thin film of an alkali metal which provides a source of ions, a layer or thin film of ion-superconducting solid electrolyte glass of high ionic conductivity and a layer or thin film of a layered intercalation compound capable of inserting ions issued from the alkali metal film. The lamellae of the thin film or layer of layered compound are oriented substantially perpendicularly parallel to the surface of the solid electrolyte. The process includes forming the layer or thin film of layered intercalation compound by forming a periodic irregularity in only the surface atoms of a substantially smooth substrate surface, and molecular beam depositing the layer or thin film of layered intercalation compound on the substrate surface containing the periodic irregularity of surface atoms. The periodic irregularity of surface atoms conditions the nucleation starting of the layered growth.

14 Claims, 2 Drawing Sheets

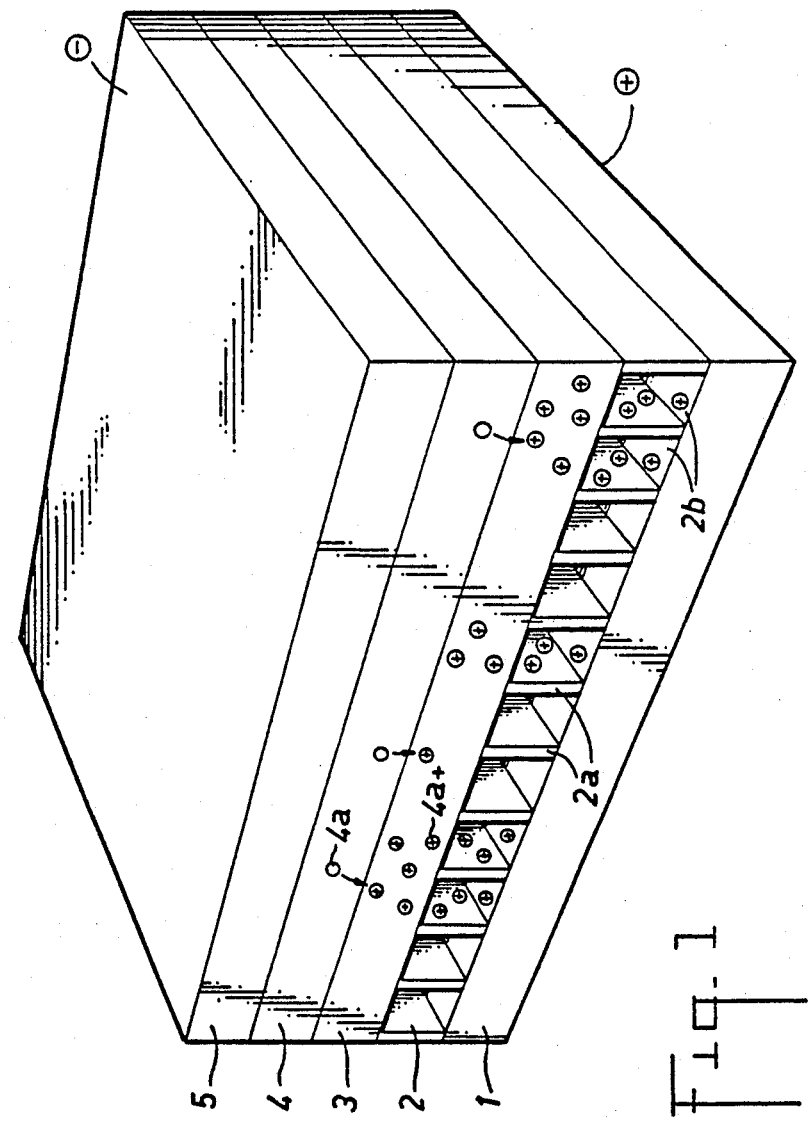

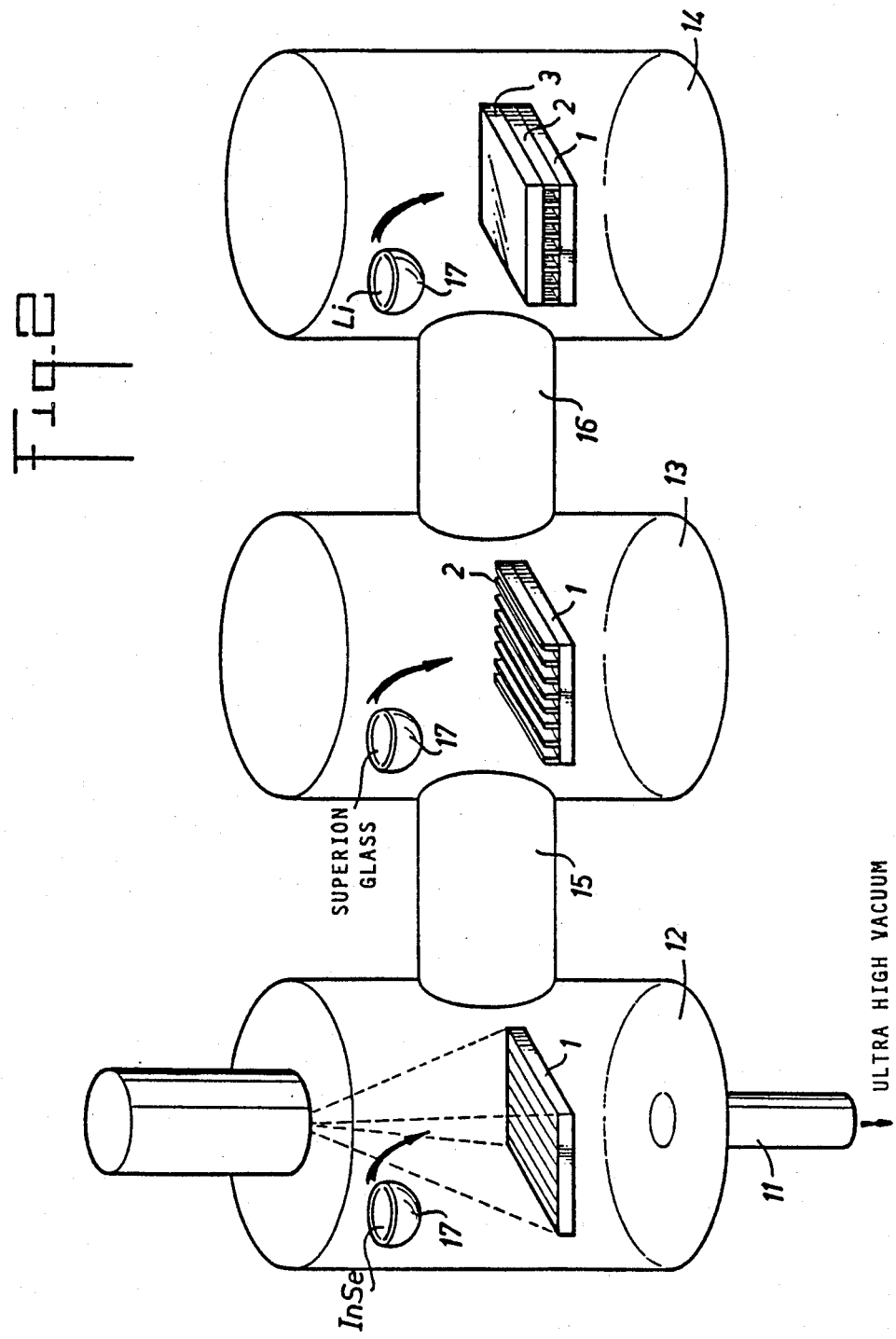

PROCESS FOR PRODUCING A SOLID STATE BATTERY

RELATED APPLICATION

The present application is a continuation-in-part application of copending application Ser. No. 859,819 filed May 5, 1986 now U.S. Pat. No. 4,730,383.

FIELD OF THE INVENTION

The present invention relates to a process for producing a solid state battery which successively comprises, superimposed between two metallic contact elements, a layer or thin film of an alkali metal, a layer or thin film of ion-superconducting solid electrolyte glass of high ionic conductivity, and a layer or thin film of a layered intercalation compound capable of inserting ions issued from the alkali metal film. The process according to the present invention particularly relates to formation of the layer or thin film of layered intercalation compound.

SUMMARY OF THE INVENTION

The present invention comprises a process for producing a solid state battery successively comprising, superimposed between two metallic contact elements, a layer or thin film of an alkali metal which provides a source of ions, a layer or thin film of ion-superconducting solid electrolyte glass of high ionic conductivity, and a layer or thin film of a layered intercalation compound capable of inserting ions issued from the layer or thin film of alkali metal. The lamellae of the thin film or layer of layered compound are oriented substantially perpendicularly to the surface of the solid electrolyte. The process of the invention includes forming the layer or thin film of layered intercalation compound by forming a periodic irregularity in only the surface atoms of a substantially smooth substrate, and molecular beam depositing the layer or thin film of layered intercalation compound on the substrate surface containing the periodic irregularity of surface atoms. The periodic irregularity of surface atoms conditions the nucleation starting of the layered growth, whereby the lamellae of the layered compound correspond with the periodic irregularity of surface atoms. The surface may comprise either one of the metallic contact elements or the ion-superconducting solid electrolyte glass. The batteries obtained by the process of the present invention may be primary or secondary batteries. Generally, the process according to the present invention provides a relatively easy method for producing thin film solid state batteries. Additional advantages of the process according to the present invention will be more fully understood in view of the following detailed description.

DETAILED DESCRIPTION

The present invention comprises a process for producing a solid state battery successively comprising, superimposed between two metallic contact elements, a layer or thin film of an alkali metal which provides a source of ions, a layer or thin film of ion-superconducting solid electrolyte glass of high ionic conductivity, and a layer or thin film of a layered intercalation compound capable of inserting ions issued from the alkali metal film.

The lamellae of the thin film or layer of a layered intercalation compound are oriented substantially perpendicularly to the solid electrolyte surface, that is, with their c-axis at an angle of substantially 0° with the surface of the solid electrolyte, in order to optimize the diffusion coefficient of the alkali metal ions. Orientations of the c-axis of the lamellae of the film of the layered compound which are slightly different than 0° with respect to the solid electrolyte are also part of the invention and correspond to a slightly smaller diffusion coefficient. The diffusion coefficient is typically as large as $10^{-9}$ cm$^2$/s when the angle of the c-axis is substantially 0° and the lamellae of the film of layered compound are substantially orthogonal to the surface of the solid electrolyte. However, the diffusion coefficient is as small as $10^{-14}$ cm$^2$/s when the angle of the c-axis is 90° and the lamellae are parallel to the surface of the electrolyte. Thus, it is important to form the lamellae substantially perpendicular to the solid electrolyte surface in order to achieve a large diffusion coefficient. Specifically, the layered compound is capable of accumulating ions by intercalation in its Van der Waals' gaps up to considerable densities. The intercalation of ions at a molar ratio is obtainable and it is possible to accommodate one ion per elementary cell of the layered compound. This leads to charge densities on the order of $10^5$ coulombs/mole and to capacities, in the case of electrolytic capacitors, on the order of $3 \times 10^3$ farads/cm$^3$.

The process for producing a solid state battery according to the present invention includes forming the layer or thin film of layered intercalation compound by forming a periodic irregularity in only the surface atoms of a substantially smooth substrate surface and molecular beam depositing the layer or thin film of layered intercalation compound on the substrate surface containing the periodic irregularity of surface atoms. The irregularity of surface atoms conditions the nucleation starting of the layered growth whereby the lamellae of the layered compound correspond with the periodic irregularity of surface atoms.

In a preferred embodiment, the periodic irregularity in the surface atoms of the substrate surface comprises vicinal surfaces which are formed by cutting the substrate surface near a dense plane to provide a variation in the surface atom density. The method for formation of vicinal surfaces by cutting the metal surface near a dense plane to provide a variation in the surface atom density is known in the art as demonstrated, for example, by Chabal et al, "Nature of Vicinal Laser-Annealed Si(111) Surfaces", The American Physical Society, *Physical Review B*, pages 3303–3309, Sept. 15, 1981. Preferably, the periodic irregularity thus formed in only the surface atoms comprises a pattern of spaced, parallel lines of vicinal surfaces whereby the layer or thin film of layered intercalation compound which is formed comprises spaced lamellae or layers parallel with one another, corresponding with the periodic irregularity of the vicinal surfaces, all of which layers or lamellae are substantially perpendicular to the solid electrolyte surface.

In another preferred embodiment, the periodic irregularity in the surface atoms of the substrate surface is formed by chemically etching faces of surface crystallites whereby the etched crystallites constitute the irregularity in the surface atoms. In a further preferred embodiment, the periodic irregularity comprises a pattern of spaced, parallel lines of etched crystallites whereby the thin film or layer of layered intercalation compound which is formed comprises parallel spaced lamellae or layers corresponding with the periodic irregularity of surface atoms, all of which layers or lamellae are substantially perpendicular to the solid electrolyte surface.

The periodic irregularity is formed on a substantially smooth substrate surface. In a preferred embodiment, the substrate may be subjected to a cleaning pretreatment in order to ensure a substantially smooth substrate surface prior to formation of the periodic irregularity of surface atoms in the substrate surface. The substrate may comprise either one of the metallic contact elements or the ion-superconducting solid electrolyte glass. When the substrate comprises one of the metallic contact elements and the thin film or layer of layered compound is then formed on the metallic contact element, the ion-superconducting solid electrolyte, the layer of alkali metal, and the other metallic contact element are respectively formed on the thin film or layer of layered compound. Alternatively, the thin film or layer of layered compound may be formed on a substrate comprising the layer of ion-superconducting electrolyte which is formed on the layer of alkali metal after deposit of the alkali metal layer on one of the metallic contact elements. To complete the battery, the other of the metallic contact elements is then formed on the thin film or layer of layered compound.

As set forth above, the process of the present invention further includes molecular beam depositing the layer or thin film of layered intercalation compound on the substrate surface containing the periodic irregularity of surface atoms. Preferably, the molecular beam deposition is effected in an ultrahigh vacuum. A vacuum of at least about $10^{-11}$ mm Hg has been found to be particularly suitable for use in the molecular beam deposition step of the present invention. In the molecular beam deposition, atoms are evaporated in an ultrahigh vacuum. The atoms recombine at points where they nucleate when they hit the substrate, namely at the periodic irregularities occurring in the surface atoms of the substrate. Thus, the moecular beam deposition results in atomic deposition to form the lamellae of the layered compound at an orientation corresponding with the periodic irregularity of the surface atoms of the substrate. Thus, in accordance with an important feature of the invention, the combination of the periodic irregularity on the substrate surface and the use of molecuar beam deposition for depositing the layered compound thereon results in the formation of a thin film of layered compound having a microstructure different from the natural crystallinity of the substrate material. That is, the microstructure of the resultant thin film of layered intercalation compound is different from that of the natural crystallinity of the substrate and corresponds to the periodic irregularity formed in the surface atoms of the substrate. This is a result significantly different from the molecular beam epitaxy techniques known in the art wherein the epitaxial deposited layer has a microstructure or crystallinity which matches the underlying substrate.

The alkali metal layer which provides a source of ions and serves as the anode of the solid state battery may comprise any alkali metal known in the art for use in solid state batteries. Preferably, the alkali metal comprises lithium.

The ion-superconducting solid electrolyte must comprise an electrolyte material of high ionic conductivity and very low electronic conductivity. Preferably, the solid electrolyte comprises a glass of the lithio borate type. Generally, such ion-superconducting glasses comprise a glass matrix, for example, a boron containing material such as $B_2S_3$ or $B_2O_3$, and a glass modifier and a glass dopant, generally comprising lithium materials such as LiCl, $Li_2SO_4$, $Li_2S$, and LiI. A preferred lithioborate glass comprises $B_2S_3$—$Li_2S$—LiI. The ion-superconducting solid electrolyte glass is amorphous and therefore is conducting at all temperatures.

The layer or thin film of layered intercalation compound generally comprises a mixed ionic and electronic conductor. Suitable compounds for use in preparing the layer or thin film of layered intercalation compound which serves as a cathode in the solid state battery are substances of the formula InSe or $In_2Se_3$ or of the formula $MPX_3$ where M is a metal selected from the group Fe, Ni and Co, P is phosphorus and X is a metalloid selected from the group O, S, Se and Te, or of the formula $MX_2$ where M is a metal selected from he group Ti, Zr, Hf, Nb, Ta, Mo or W, and X is a metalloid selected from the group O, S, Se, and Te. In a preferred embodiment, the cathode layer thin film is formed of InSe.

The three layers mentioned above, namely the anode-ion source ayer, the ion-superconducting solid electrolyte layer and the cathode-intercalation compound layer, are preferably formed by deposits made successively on one of the metallic contact elements, this leading to a structure where the electrolyte/electrode interfaces are formed by continuous growth and constitute heterojunctions. The layers are advantageously thin films, preferably of thickness less than 1 $\mu$m.

Regarding the thin film or layer of layered compound, the efficiency of the intercalation, which determines the capacity of the battery, depends on the orientation of the lamellae with respect to its substrate. The capacity will be optimum if the whole layer of layered compound is completely intercalated at least to the molar concentration, each elementary cell then having received one intercalation ion. The maximum thickness of this layer is a function of the coefficient of diffusion of the intercalation ions, as wel as of the duration of the intercalation process.

Regarding the layer of superionic electrolyte, its thickness may be significantly less than 1 $\mu$m. However, the thickness of the solid electrolyte layer should be sufficient for the electronic resistance of the layer to remain very high and in order to avoid dielectric breakdown by the voltage of the battery. In this way, the electrolyte remains a nearly-perfect electronic insulator, this allowing the battery to be stored for long periods when not in use. On the other hand, the ionic resistance of the solid electrolyte is favorably reduced due to the decrease in its thickness. When the thickness of the electrolyte is on the order of the size of the mean free path of the ions, their mobility will be extremely high and the ionic conductivity will be extremely large.

In one embodiment of the invention, the respective layers of anode, electrolyte and cathode of the battery may themselves be made of several layers or thin films.

It is seen from the foregoing that the process of the present invention makes it possible to produce microminiaturized solid state batteries of high capacity, which, by their structure and dimensions, are perfectly compatible with the integrated circuits widely used in the domain of electronics. An integrated circuit, incorporating such a battery, offers complete operational independence with only a slight increase in volume.

The process of the invention will be more readily understood in view of the accompanying drawings and description thereof, in which:

FIG. 1 schematically shows, in perspective and on a considerably enlarged scale, a solid state battery produced according to the process of the invention; and FIG. 2 schematically shows an apparatus for producing the battery of FIG. 1.

Referring now to the drawings, the battery shown in FIG. 1 is composed of superimposed thin layers between two contact elements. The battery comprises a metallic contact element 1 made of an appropriately chosen metal, for example, nickel, in the form of either a thick substrate or a thin layer deposited on a substrate. The battery further comprises a thin intercalation layer 2 of layered compound comprising, for example, InSe, of which the lamellae 2a are oriented in the direction of the thickness of the layer, substantially perpendicularly to the surface of the layers, and a thin layer 3 comprising an ion-superconducting solid electrolyte glass, for example, a glass of the lithio borate type of formula $B_2S_3$—$Li_2S$—LiI. The battery also includes a thin layer 4 of an alkali metal such as lithium, which provides a source of ions $4a+$ moving through the electrolyte layer 3, and a thin metallic contact layer 5 made, for example, of nickel.

The layered thin film or layer 2 constitutes the cathode of the battery and the positive pole is connected to the adjacent contact element 1, while the alkali metal layer 4 constitutes the anode, the negative pole being connected to the contact element 5 adjacent thereto.

During the battery charging operation, the alkali metal atoms 4a of layer 4 are ionized in the electrolyte layer 3 and the ions $4a+$ reach the lamellae intercalation layer 2 and penetrate directly into the Van der Waals' gaps 2b separating the lamellae 2a. These gaps are thus filled with ions $4a+$ up to the molar concentration of one ion for each InSe unit cell of the layer 2.

A difference in potential thus appears between layers 2 and 4, and therefore between contact elements 1 and 5, element 1 being taken to a positive potential with respect to that of element 5. This difference in potential is capable of creating a discharge current in a user circuit connected to the positive and negative terminals of the battery, as the process of intercalation of the ions in the layer 2 is a reversible phenomenon.

The process according to the invention may be effected using the apparatus shown in FIG. 2. The apparatus of FIG. 2 comprises three ultrahigh vacuum chambers 12, 13 and 14, connected together by lock chambers 15 and 16, as well as to an ultrahigh vacuum pump via conduit 11. Each chamber contains a molecular beam furnace 17, in which is placed a substance which may be vaporized by a heating means (not shown), in order to obtain a deposit of said substance on a substrate introduced into the chamber.

The process of the invention may be carried out as follows. In the first chamber 12 is disposed a metallic substrate 1. The substance intended to form the layered intercalation layer 2, for example InSe, is placed in the corresponding furnace 17. The substrate 1 which is provided in chamber 12 has previously been provided with a periodic irregularity in the surface atoms of the substrate surface. For example, the periodic irregularities may comprise a pattern of vicinal surfaces formed by cutting the surface substrate near a dense plane to provide a variation in the surface atom density, or a pattern of etched crystallites formed by chemically etching faces of surface crystallites.

In the first chamber 12, the substrate 1 thus receives a layer of the molecular beam deposited intercalation compound, InSe. The deposited material grows along the periodic irregularity of surface atoms previously created on the substrate surface, the periodic irregularity starting the nucleation pattern and conditioning the growth by molecular beam deposition.

The substrate 1, coated with the layer 2 of InSe in which the lamellae are substantially perpendicular to the surface of the substrate, is then transferred, via lock chamber 15, into the second chamber 13 of which furance 17 contains an ion-superconducting solid electrolyte glass, for example, a lithio-borate glass ($B_2S_3$—$Li_2$S—LiI). This substance forms a thin layer 3 by vapor deposition on layer 2. The assembly 1, 2, 3 is then transferred into the third chamber 14, via lock chamber 6, where it receives a thin layer 4 of an alkali metal such as lithium formed by vapor deposition on the ion-superconducting electrolyte layer 3. Finally, a metallic contact material 5 is deposited on layer 4 to provide a second contact element.

It is also possible to proceed in reverse order and deposit on contact element 5 the lithium anode 4, on which is then deposited the ion-superconducting solid electrolyte glass 3. It is on this electrolyte layer that the periodic irregularity of surface atoms is then formed which allows molecular beam deposition of the cathode of layered compound 2 with lamellae 2a substantially perpendicular to the electrolyte layer 3.

The principal chamber 12 where the molecular beam deposition of the layer of the lamellar intercalation compound on a substrate is to be effected, may be endowed with characterization means, including crystallographic (LEED), chemical (localized Auger spectrometry) and electronic (XPS and UPS) means, making it possible to monitor correct development of the different steps of the process.

The specific embodiments set forth above are to illustrate the process of the present invention and are not intended to limit the scope of the process of the present invention. Additional embodiments and advantages within the scope of the claimed invention will be apparent to one of ordinary skill in the art.

What is claimed is:

1. A process for producing a solid state battery successively comprising, superimposed between two metallic contact elements, a layer or thin film of an alkali metal which provides a source of ions, a layer or thin film of ion-superconducting solid electrolyte glass of high ionic conductivity, and a layer or thin film of a layered intercalation compound capable of inserting ions issued from the layer or thin film of alkali metal, the lamellae of the thin film or layer of layered compound being oriented substantiallly perpendicularly to the surface of the solid electrolyte, said process including forming the layer or thin film of layered intercalation compound by the steps of (a) forming a periodic irregularity in only the surface atoms of a substantially smooth substrate surface, the substrate being selected from the group consisting of one of said metallic contact elements and said ion-superconducting solid electrolyte glass, and (b) molecular beam depositing the layer or thin film of layered intercalation compound on the substrate surface containing the periodic irregularity of surface atoms, the periodic irregularity of surface atoms conditioning the nucleation starting of the layered growth, whereby the lamellae of the layered compound correspond with the periodic irregularity of surface atoms.

2. A process for producing a solid state battery as defined by claim 1, wherein the periodic irregularity in the surface atoms comprises vicinal surfaces formed by cutting the substrate surface near a dense plane to provide a variation in the surface atom density.

3. A process for producing a solid state battery as defined by claim 1, wherein the periodic irregularity in the surface atoms is formed by chemically etching faces of surface crystallites.

4. A process for producing a solid state battery as defined by claim 2, wherein the periodic irregularity in only the surface atoms comprises a pattern of spaced, parallel lines of vicinal surfaces.

5. A process for producing a solid state battery as defined by claim 3, wherein the periodic irregularity in only the surface atoms comprises a pattern of spaced, parallel lines of etched crystallites.

6. A process for producing a solid state battery as defined by claim 1, wherein the molecular beam deposition is effected in an ultrahigh vacuum.

7. A process for producing a solid state battery as defined by claim 6, wherein the molecular beam deposition is effected in a vacuum of at least about $10^{-11}$ mm Hg.

8. A process for producing a solid state battery as defined by claim 1, wherein the thin film or layer of layered compounds is formed on one of the metallic contact elements, and, on the layer thus obtained, the layer of ion-superconducting solid electrolyte glass and the layer of alkali metal are formed, respectively.

9. A process for producing a solid state battery as defined by claim 1, wherein the thin film or layer of layered compound is formed on the layer of ion-superconducting solid electrolyte glass, which is previously formed on the layer of alkali metal, after deposit of said alkali metal layer on one of the metallic contact elements.

10. A process for producing a solid state battery as defined by claim 1, wherein the layer or thin film of layered intercalation compound is formed of a substance selected from the group consisting of InSe, $In_2Se_3$, $MPX_3$ where M is a metal selected from the group Fe, Ni and Co, P is phosphorus and X is a metalloid selected from the group O, S, Se and Te, and $MX_2$ where M is a metal selected from the group Ti, Zr, Hf, Nb, Ta, Mo and W and X is a metalloid selected from the group O, S, Se and Te.

11. A process for producing a solid state battery as defined by claim 10, wherein the layer or thin film of layered intercalation compound comprises InSe.

12. A process for producing a solid state battery as defined by claim 1, wherein the layer or thin film of ion-superconducting solid electrolyte glass is formed of a lithio-borate glass.

13. A process for producing a solid state battery as defined by claim 12, wherein the layer of thin film of ion-superconducting solid electrolyte glass is formed of a lithio-borate glass comprising $B_2S_3$—$Li_2S$—$LiI$.

14. A solid state battery successively comprising, superimposed between two metallic contact elements, a layer or thin film of an alkali metal which provides a source of ions, a layer or thin film of a ion-superconducting solid electrolyte glass of high ionic conductivity, and a layer or thin film of a layered intercalation compound capable of inserting ions issued from the alkali metal, the lamellae of the thin film or layer of layered compound being oriented substantially perpendicularly to the surface of the solid electrolyte, said layer of thin film of layered intercalation compound comprising InSe.

* * * * *